(12) United States Patent
Marquez, Jr. et al.

(10) Patent No.: US 9,625,347 B2
(45) Date of Patent: Apr. 18, 2017

(54) ADAPTOR, SYSTEM, AND METHOD FOR INFLATING A GLOVE

(71) Applicant: San Diego Gas & Electric Company, San Diego, CA (US)

(72) Inventors: Rogelio Marquez, Jr., Bonita, CA (US); Daniel P. Rodriguez, Carlsbad, CA (US)

(73) Assignee: San Diego Gas & Electric Company, San Diego, CA (US)

( * ) Notice: Subject to any disclaimer, the term of this patent is extended or adjusted under 35 U.S.C. 154(b) by 188 days.

(21) Appl. No.: 14/314,884

(22) Filed: Jun. 25, 2014

(65) Prior Publication Data

US 2015/0000381 A1 Jan. 1, 2015

Related U.S. Application Data

(60) Provisional application No. 61/839,720, filed on Jun. 26, 2013.

(51) Int. Cl.
*G01M 3/20* (2006.01)
*G01M 3/12* (2006.01)
*G01M 3/02* (2006.01)

(52) U.S. Cl.
CPC .............. *G01M 3/027* (2013.01); *G01M 3/12* (2013.01); *G01M 3/20* (2013.01)

(58) Field of Classification Search
CPC .......... G01M 3/27; G01M 3/12; G01M 3/142; G01M 3/2218; G01M 3/227; G01M 3/3218
See application file for complete search history.

(56) References Cited

U.S. PATENT DOCUMENTS

| | | | | | |
|---|---|---|---|---|---|
| 2,054,204 | A | * | 9/1936 | McDonald | G01M 3/027 73/45.5 |
| 2,074,140 | A | * | 3/1937 | Bates | D06F 3/00 223/61 |
| 2,799,882 | A | * | 7/1957 | Falk | G01M 3/00 215/391 |
| 3,603,138 | A | * | 9/1971 | Peterson | G01M 3/3218 73/37 |
| 3,991,604 | A | * | 11/1976 | Hayes | G01M 3/027 73/37 |
| 4,072,171 | A | * | 2/1978 | Nakazawa | A61B 5/0235 137/599.18 |

(Continued)

OTHER PUBLICATIONS

Salisbury by Honeywell; Salisbury Product Catalog 2010; found at http://ljmequipment.com/PDF/Salisbury_Product_Catalog_2010.pdf. p. E-4; 2010.*

(Continued)

*Primary Examiner* — Daniel J Colilla
(74) *Attorney, Agent, or Firm* — Klein, O'Neill & Singh, LLP

(57) ABSTRACT

An adaptor for use to direct pressurized fluid into a glove to inflate the glove is disclosed. A kit for holding several test components for use to inflate a glove is also disclosed. The kit is provided for testing a glove for leakage. The components include an adaptor, a strap, and a portable pump, which can be either a DC-powered air compressor or a hand or foot pump. A method is also disclosed for inflating a glove to test the glove for leaks.

13 Claims, 7 Drawing Sheets

(56) References Cited

U.S. PATENT DOCUMENTS

| | | | | |
|---|---|---|---|---|
| 6,379,178 B1* | 4/2002 | Jones, III | ............... | H01R 13/60 |
| | | | | 224/483 |
| 2006/0144127 A1* | 7/2006 | Westerberg | ............. | G01M 3/38 |
| | | | | 73/40 |
| 2011/0253184 A1* | 10/2011 | Mills | ....................... | E04H 15/20 |
| | | | | 135/96 |

OTHER PUBLICATIONS

Task No. 103; Tampa Electric Company; found at http://www.tampaelectric.com/files/powerpros/powerprossamplemodule.pdf; pp. 6-9; 1990.*

* cited by examiner

ADAPTOR, SYSTEM, AND METHOD FOR INFLATING A GLOVE

FIELD OF ART

The present disclosure relates to portable adaptor, system, and method for inflating and testing the insulating fitness of electrical insulating gloves and similar objects.

BACKGROUND

Electrical insulating gloves are typically made of rubber or some other non-conductive material. It is desired by electrical workers to test their insulating gloves frequently for holes or other defects to ensure that the gloves maintain their insulating properties, thus providing a peace of mind for the safety of the electrical worker.

Several testing products are available for use to test gloves in the service shop, some of which are pedestal styles, others are bench top styles, and yet others are of the water immersing types. In general, gas or air based testing products provide the means for directing pressurized gas into the insulating glove to test the glove for leakage, such as due to holes or other defects, thus a potential source for arcing. However, not all devices are the same and some are complicated or too bulky to be readily usable for on-site testing.

SUMMARY

Aspect of the present disclosure includes a system for testing a glove's integrity, such as testing the glove for leaks. In an embodiment, the system comprises a container holding a plurality of components for testing a glove; said plurality of components comprising an adaptor having a first end and a second end, said first end sized and shaped to create a sealed volume in combination with a glove to be tested; an inflation device for generating pressurized fluid for introduction into the sealed volume; an air hose for connecting the inflation device to the adaptor; a strap configured to tightened around the first end of the adaptor for securing a glove to the first end of the adaptor; a dispenser for dispensing a leak detection substance on an exterior surface of a glove during testing of the glove; and wherein the inflation device operates on DC power or is manually operable.

A further feature of the present disclosure is an adaptor for use to direct pressurized fluid into an interior of a glove to test the glove. In one embodiment, the adaptor comprises a body comprising a first section having a first end and a second section having a second end and formed from a non-compressible material; the first section comprising an interior surface defining a first bore section and an exterior surface comprising an external annular groove; the second section comprising a second bore section, an end surface, and an inlet bore formed through the end surface; a one-way valve connected to the inlet bore at the end surface, said valve having a spring; and a transition disposed between the first section and the second section and wherein the first section is about 1.4 to about 2.5 times larger in cross-sectional dimension than the second section.

A yet further feature of the present disclosure is a method for testing a glove's integrity. In one embodiment, the method comprises the steps of placing a cuff of a glove around a first end of an adaptor; tightening a strap around the cuff and against a groove on an exterior surface of the adaptor; connecting a hose to a valve located at a second end of the adaptor and to a portable air compressor; applying leak detection fluid to the glove; connecting a power cable, which is connected to the portable air compressor, to a DC power source; and powering up the air compressor to direct pressurized air in through the valve and into the glove.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

The detailed description set forth below in connection with the appended drawings is intended as a description of the presently preferred embodiments of an apparatus, system, and method for testing gloves, such as electrically insulating gloves, provided in accordance with aspects of the present disclosure and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
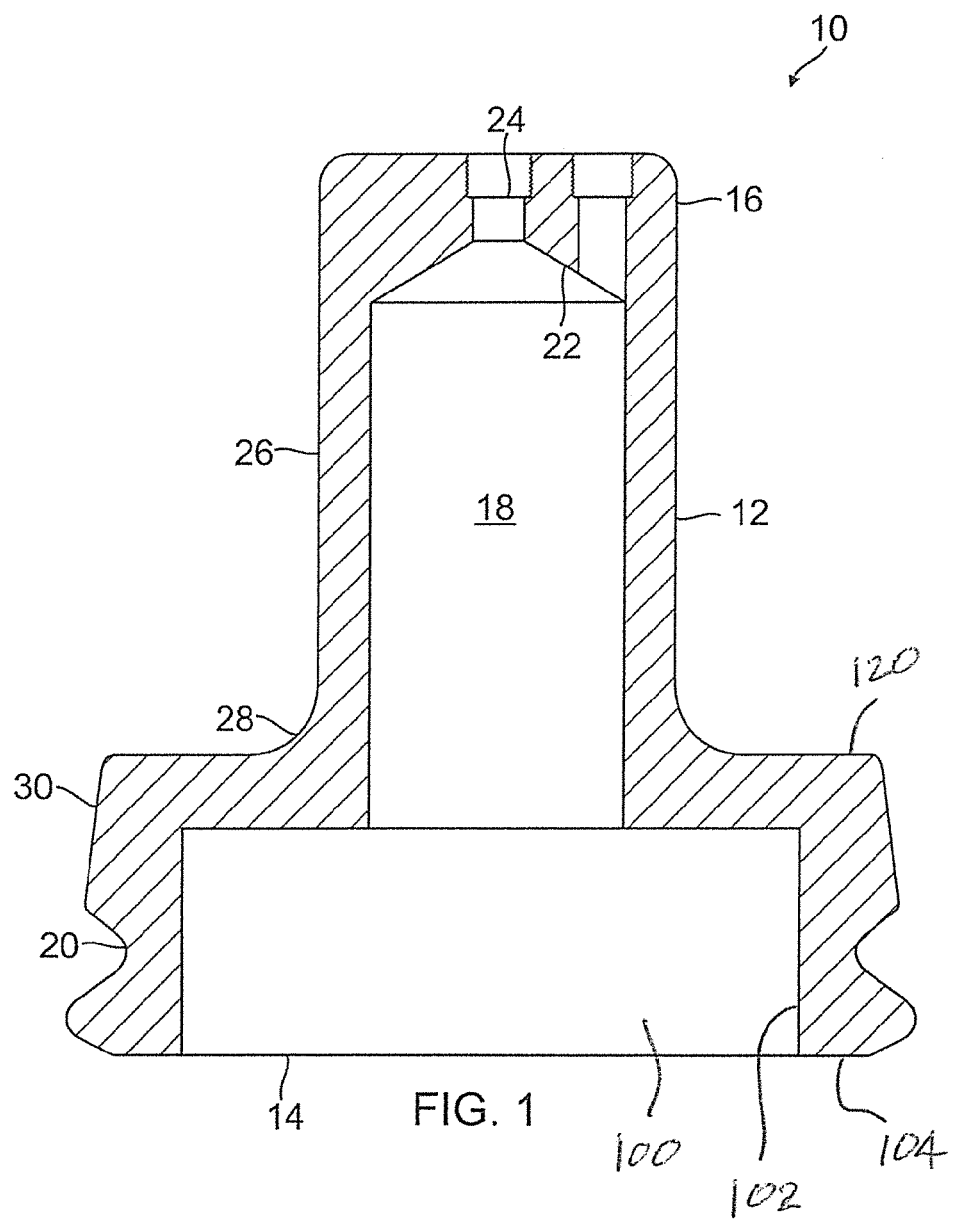
FIG. 1 shows a cross-sectional side view of an adaptor provided in accordance with aspects of the present disclosure.

With reference to FIG. 1, an adaptor 10 provided in accordance with aspects of the present device, system, and method is shown for use to direct a pressurized fluid, such as pressurized air, into a glove for testing the integrity of the glove. Exemplary electrical insulating gloves include those that meet ANSI/ASTM D120 standard and NFPA 70E for use around electrical hazards and arc flash protection, for example PIP Novax, Stanco, and Cementex electrical insulating gloves. The adaptor 10 may be used to direct pressurized air in through the cuff portion of an electrically insulating glove to test the integrity of the glove before the glove is used by a journeyman or a utility worker on a live wire. In one example, the adaptor 10 comprises a body 12 having first end 14 and a second end 16 with a transition 28 therebetween. The first end 14 is shown with a larger cross section or wide body 30, such as a larger diameter or dimension, than a relatively smaller cross section or narrow body 26, such as a smaller diameter or dimension, at the second end 16. Both the first end 14 and the second end 16 are open and a central or main bore 18 connects the first end with the second end. The first end 14 may also be referred to as the glove end, as it connects or receives a glove, and the second end 16 may be referred to as the source end, as it is where a pressurized fluid source is connected for directing pressurized fluid, such as air or nitrogen, in through the central bore 18 and into the interior space of the glove at the first end to inflate the glove. The wide section 30 may be referred to as the first section while the narrow body 26 may be referred to as the second section.

In one example, the narrow body 26 is solid or rigid, such as being non-collapsible, to facilitate assembly and use. For example, inlet and/or relief valves are mounted to the second section 26 and the second section may be manipulated, handled, grabbed, leveraged, etc. when mounting the glove and the hose to the adaptor and then later grabbed again to apply an inspection solution. Thus, in one example, the second section 26 has a solid or rigid length and an outside diameter of about 1.5 inches to about 2.5 inches. However, other dimensions are contemplated, including 1 inch to about 3.5 inches. The rigid construction with generally straight interior walls also allows for easier machining and manufacturing of the adaptor.

In use, the cuff of a glove (not shown) to be inspected is mounted onto the first end 14 to close around the opening 100. In one example, the opening 100 is about the size of the first section 30 less its wall thickness. In another example, the opening 100 is reduced by an end plate or end wall (not shown). In still another example, the interior surface 102 at the first end 14 is fitted or formed with an attachment, such as internal threads, for attaching to a form fitting adaptor (see, e.g., FIG. 6A). The form fitting adaptor may part of a form fitting adaptor set having a plurality of different diameters for use with different sized cuffs. For example, if the first section 30 is too wide or too small for use with typical electrical insulation gloves, then a form fitting adaptor set having a plurality of different diameters may be used for attaching to the first section 30 while also providing a range of different sizes (similar to different second end 16) for use with a particular cuff size. In an alternative embodiment, the form fitting adaptor (not shown) may be attached to the end 104 or to a fastening means located on an outside surface of the first end 14. Preferably, the interior surface is generally straight and terminates at the end opening 100. In other words, the end opening 100 and the interior diameter defined by the interior surface 102 is approximately the same. This minimizes or decreases any potential uneven or turbulent fluid flow that passes in through the central bore 18 and into the glove during testing, as further discussed below.

As shown, an annular groove 20 is provided at the first end 14 so that a re-useable band or strap (not shown) can wrap around the glove and the groove 20 to hold the glove in place against the groove at the first end 14. When the band or strap (not shown) is tightly wrapped over the glove and against the groove 20, a fluid tight seal is formed between the interior surface of the glove and the surface of the groove 20. The groove 20 may embody any number of shapes that will allow the band or strap to tighten and to seal the cuff of the glove around the opening 100. For example, the groove 20 may be concave as shown with a smooth surface, concave with generally flat surfaces, such as a U-groove, or concave with V-groove. The band or strap (not shown) should have the same contour as the groove to ensure a form fitting engagement when tightened around the groove. In one example, the band or strap is similar to a typical plastic zip tie but with a release lever, tab, or tongue to facilitate opening or releasing the strap from the first end. Such strap or band may be referred to as releaseable cable tie and is offered by Monoprice, Gardner Bender, and Panduit. As shown, the first section 30 has a circular configuration about the lengthwise longitudinal axis of the adaptor with a slight inwardly taper from the end 104 towards the base 120 of the first section. In an alternative embodiment, the first section has an elliptical or oval configuration about the lengthwise longitudinal axis. As shown, the first end 14 has an outside diameter of about 5.25 inches to about 6.5 inches. However, other dimensions are contemplated, including a range of about 4 inches to about 7.5 inches.

An enlarger 22 is disposed in the interior of the adaptor at the second end 16, connecting the entrance bore or inlet bore 24 to the interior cavity 18. Pressurized fluid is configured to flow from the second end 16 to the first end 14 through the inlet bore 24. In one example, a compressed air source (not shown) is connected to the entrance bore 24 at the second end 16 to inflate a glove located at the first end 14. In the example shown, the second end 16 further comprises a relief bore 25 to relieve pressure from inside the bore to the atmosphere following the glove testing. A spring actuated or a disc actuated relief valve may be attached to the relief bore 25 for releasing pressure from inside the bore following successful testing of a glove before disconnecting the glove from the first end 14, as further discussed below. In another example, due to the low pressure practice of glove testing, the band or zip tie is simply loosen to release the internal pressure without having to separately open a relief valve or bleed pressure out of the inlet valve (i.e., Schrader valve), as further discussed below. Glove testing and glove care may be practiced pursuant to ASTM standard, F496-08.

As previously described, the adaptor 10 has a body 12 comprising a narrow body portion 26 and a wide body portion 30 with a transition 28 located therebetween. As shown, the second body section 26 extends partially along the body 12 in a generally cylindrical fashion and is enlarged at a transition 28 into an enlarged first section 30 at the first end 14.

In one example, the adaptor 10 is made from a hard plastic material such as acrylonitrile butadiene styrene (ABS), polycarbonate (PC) or similar hard plastics. Alternatively, the adaptor 10 may be made from a light weight metallic material, such as aluminum, or a thinned wall high tensile strength material, such as carbon steel or stainless steel. In some embodiments, the adaptor 10 is unitarily formed. In other embodiments, the first and second sections may be formed separately and subsequently connected.

Figure 2:
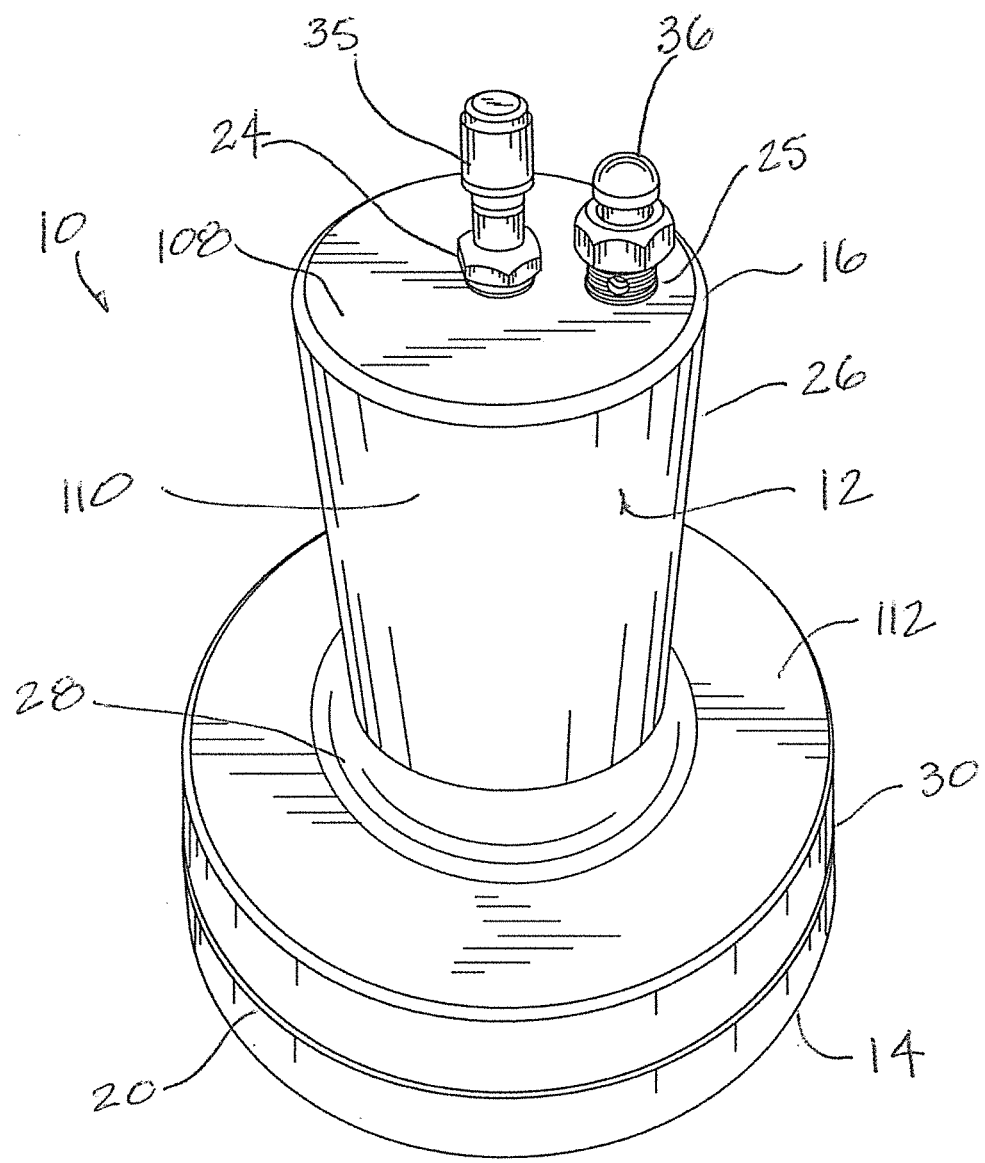
FIG. 2 shows a perspective view of the adaptor of FIG. 1.

FIG. 2 illustrates a perspective view of the adaptor device 10 of FIG. 1. The narrow body 26 is shown extending upwardly from the transition 28 and terminates at the second end 16, which has an end wall 108. A valve 35 is attached to the entrance bore 24 for controlling fluid flow into the central bore 18 of the adaptor body 12. The valve 35 can be any of a number of different valve types, including one way or check valves, for example, a Schrader or a Presta valve. A second valve 36 is connected to the relief bore 25. The second valve 36 functions to depressurize the adaptor 10 after glove testing is complete and can be a finger actuated relief valve that breaks a seal to release pressure from inside the housing bore 18. The seal of the relief valve 36 may be re-sealable by spring force. In another example, the relief valve 36 is a rupture-able or actuate-able pressure relief valve that automatically opens once the internal pressure reaches a certain pressure, such as 14 inches of water pressure to about five pounds (psi) of pressure with three psi being more preferred. The two valves may be mounted to the two bores in any manner that ensures an airtight connection.

In some embodiments, the valves are attached by threaded connections to the entrance bore 24 and the relief bore 25. In other embodiments, the valves are attached by other air tight connections, such as by permanent bonding. In some embodiments, the entrance bore 24 and the relief bore 25 may be combined into a single aperture, and the two functions incorporated into a single valve structure. For example, the Schrader valve can pass fluid in either direction. In some embodiments, the entrance bore 24 and the relief bore 25 may be located on other surfaces or other parts of the wall 110 of the body section 26. In still other embodiments, the entrance bore 24 and relief bore 25 may be located on the planar surface 112 of the first section 30.

The first section 30 is also shown in perspective in FIG. 2, which in one embodiment is about 50% to about 150% larger in cross-sectional dimension than the second section 26. A rounded transition 28 is located between the two sections. Also shown in perspective is an annular groove 20, which is configured to receive a removable strap or band for strapping an electrical insulating glove to the first section 30.

Although the second section 26 is shown generally cylindrical, the second section may have any shaped cross section along the longitudinal axis of the body 12. For example, the cross-section end view of the second section 26 could be elliptical, square, rectangular, diamond, or triangular. Additional configurations are discussed below with reference to FIGS. 6A-6D. In still other embodiments, the cross-sectional end view of the second section 26 may be non-circular or non-elliptical but have rounded corners and edges.

Figure 3:
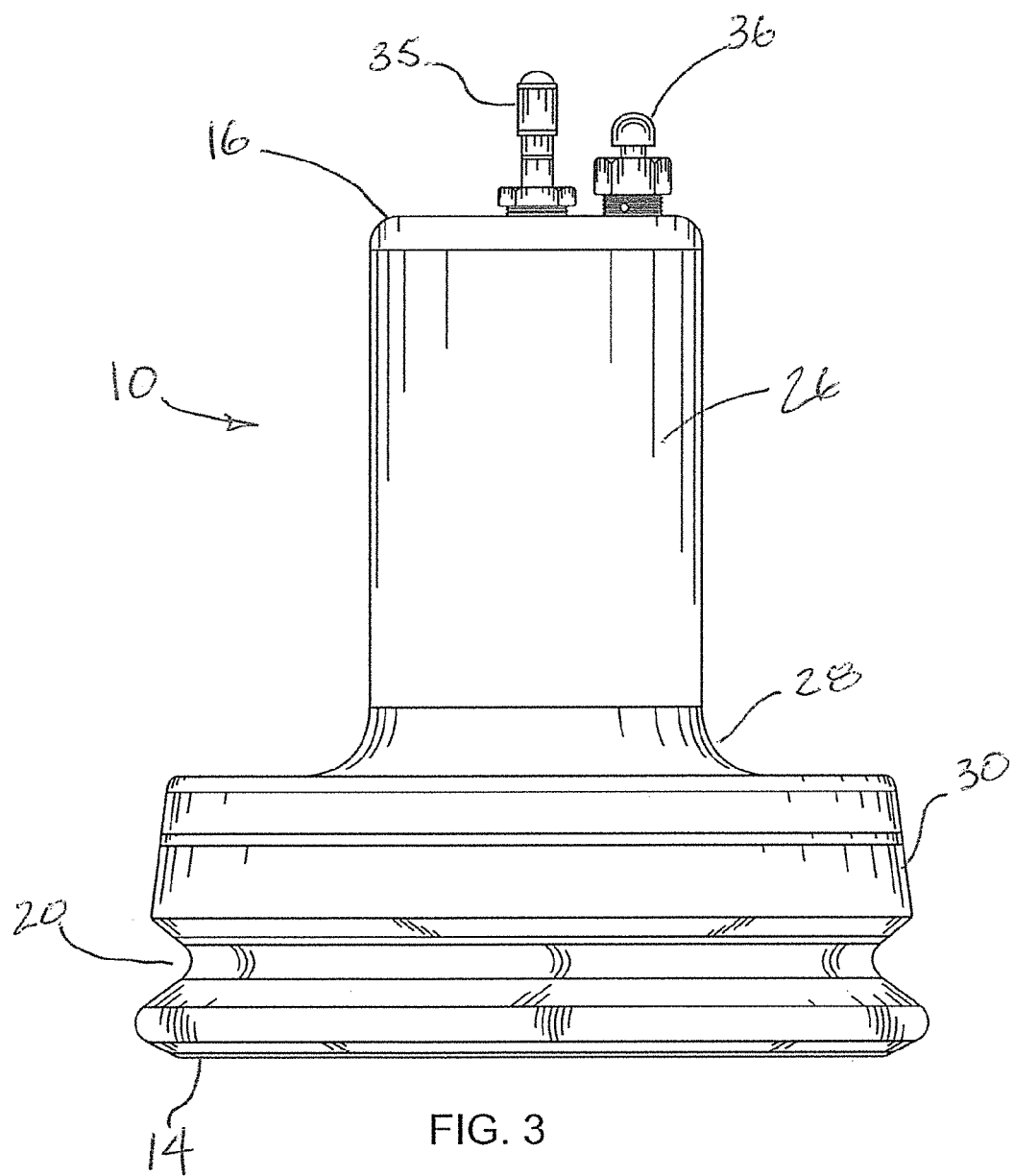
FIG. 3 shows a side elevation view of the adaptor of FIG. 1.

FIG. 3 illustrates a side elevation view of the adaptor 10 of FIG. 2. The second section 26 is clearly shown of a length and diameter so that it may be easily grasped in one hand during the testing of a glove. In some embodiments the surface of the second section may contain grooves to facilitate gripping. In other embodiments, the surface of the second section 26 may be stippled or an array of projections or dimples added to increase friction when grasped by a user. In still other embodiments, non-slip gripping paper, such as sand-paper and the like, may be applied to the exterior surface of the second end 26 to facilitate gripping.

Figure 4:
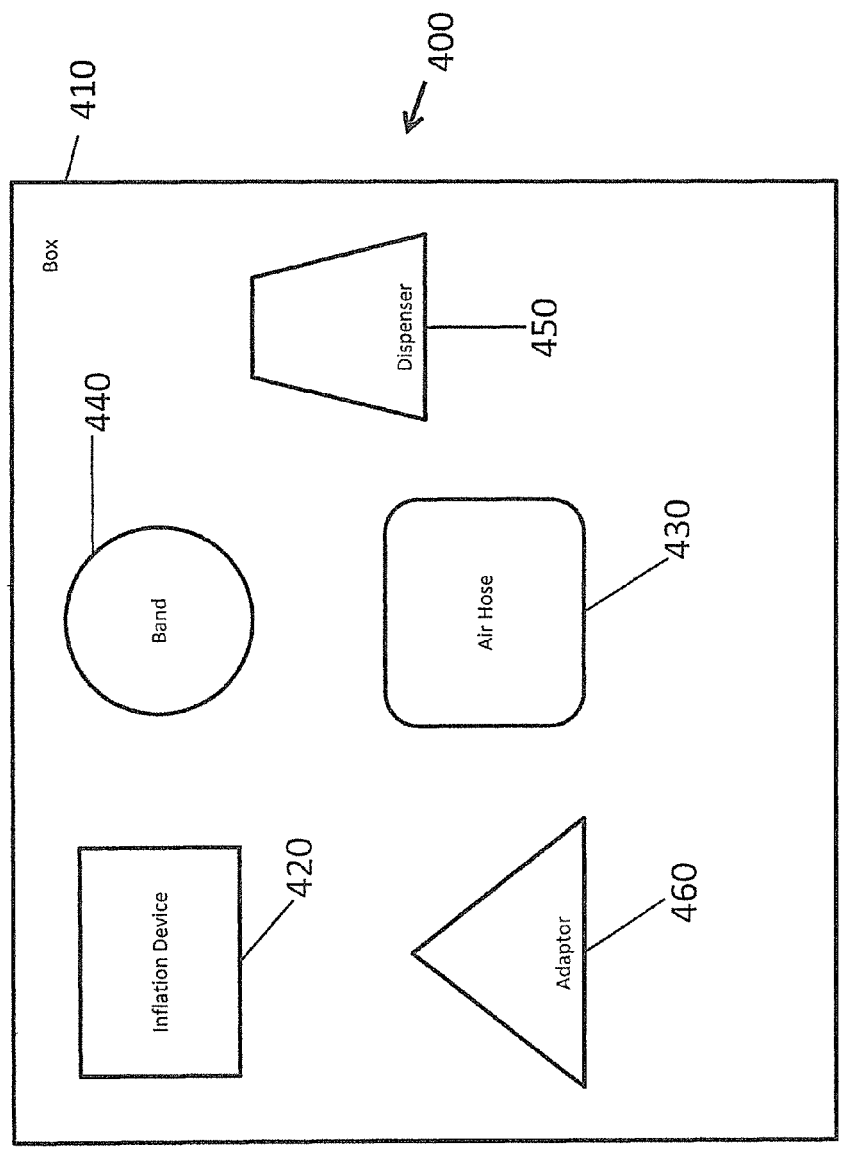
FIG. 4 shows a schematic view of a system comprising a plurality of components for field testing an electrically insulating glove.

FIG. 4 illustrates a schematic view of a system 400 for testing and/or inspecting electrical insulating gloves remotely or on-site in accordance with aspects of the present disclosure. The system 400 is portable and configured for use on a remote or semi-remote job site or other similar austere environment. The system is configured to be used away from traditional AC power sources, such as structures having electrical wall outlets, but may optionally be used with traditional pressurized fluid sources. For example, the system may be used plant air pressure to test gloves before heading out to the job site. As shown, the system 400 comprises a storage container 410, such as a bucket with a lid, for storing or holding an inflation device 420, an air hose 430, a band or strap 440, or optionally several bands or straps, an adaptor 460, such as the adaptor 10 of FIGS. 1-3, and a dispenser 450 for dispensing detection fluid to detect leakage, such a bubble soap container.

The container 410 preferably includes a handle for carrying and the container has a sufficiently large holding space for consolidating and carrying the various components from site to site for testing. The container is sized and shaped, such as a 5-gallon round plastic bucket or a 4-gallon square easy store plastic bucket, to carry the inflation device 420, air hose 430, band or strap 440, dispenser 450, and adaptor 460. In one example, the container 410 and lid is sealed together with the components positioned inside the container with a peelable security strap, similar to the peelable strip on a one-gallon milk bottle or other safety caps. The seal ensures that the system is properly packaged with all the necessary components for testing electrical insulating gloves before the system is shipped to an end-user. Once the peelable strip is removed, the lid may be open to access the components inside and reattached to close the box or container 410.

In one example, the inflation device 420 is a portable air compressor or pump for use to generate pressurized fluid, such as pressurized air. Portable air compressors and pumps are well known in the art and are typically carried in vehicles for emergency inflations of vehicle tires. Exemplary portable air compressors are available from VIAIR, Masterflow, and SuperFlow, which offer portable air compressors with 12-Volt motors. The air compressors have adapters in the form of a long cord to be powered by the 12V outlets typically found in vehicles, such as cigarette lighter receptacles. In some embodiments, a manually operated hand pump or foot pump may be used if 12-volt power is not available. In some embodiments, the air compressor or manually operated pump has an integrated pressure gauge. The gauge may be used to judge or read how much pressure is used to pressurize the glove when performing the test.

The air hose 430 may be a typical hose with a first end having a fitting for connecting to the compressor or manual hand/foot pump and the second end can have a head valve for fitting over the Schrader or Presta valve.

The band or strap 440, or a plurality of bands or straps, is provided to hold the glove in place while the system and the glove are put under pressure. In one example, the system is pressurized to about 3 psi and the glove is swabbed for evidence of leakage, as further discussed below. However, other pressure range or test pressure is contemplated. For example, some tests may be conducted at about 1½ times the normal cuff diameter. The band or strap is reusable and can be of any design that allows for it to be cinched down and hold the glove over the first end 14 of the adaptor 10 and subsequently releasable to allow removal of the glove from the adaptor. Examples include a zip tie design, double D-ring designs, snap and lock plastic buckles with adjustable belts, and bands or straps with slide bar cinch buckles. Other examples include releaseable cable ties also offered by Monoprice, Gardner Bender, and Panduit.

A dispenser 450 for dispensing leak indicating substance, such as soap, of sufficient volume to test a number of gloves is provided. In some embodiments, the container has a spray cap. In other embodiments, the bottle has a flip top cap so that the leak indicating substance is spread on the glove by squeezing the bottle. In still other embodiments, a pump cap is provided.

The adaptor 460 can be the adaptor 10 of FIGS. 1-3, discussed above.

Thus, aspect of the present disclosure is understood to include a kit comprising various components for remotely testing an electrically insulating glove. A further aspect of the present disclosure is understood to include a method for utilizing a kit to test an electrically insulating glove. In one example, the kit comprises a bucket or container having a removable and reusable lid and a plurality of testing components. In an embodiment, the components include an inflation device, which can be a DC-power operated portable air compressor or a manual hand or foot pump, an air hose, a releaseable strap, a leak detection fluid, such as liquid soap, and an adaptor, such as the adaptor 10 shown and described with reference to FIGS. 1-3. The bucket may have a handle and the lid may have a peelable security strip. In another example, both a DC-power operated portable air compressor and a manual hand or foot pump are provided in the container.

Figure 5:
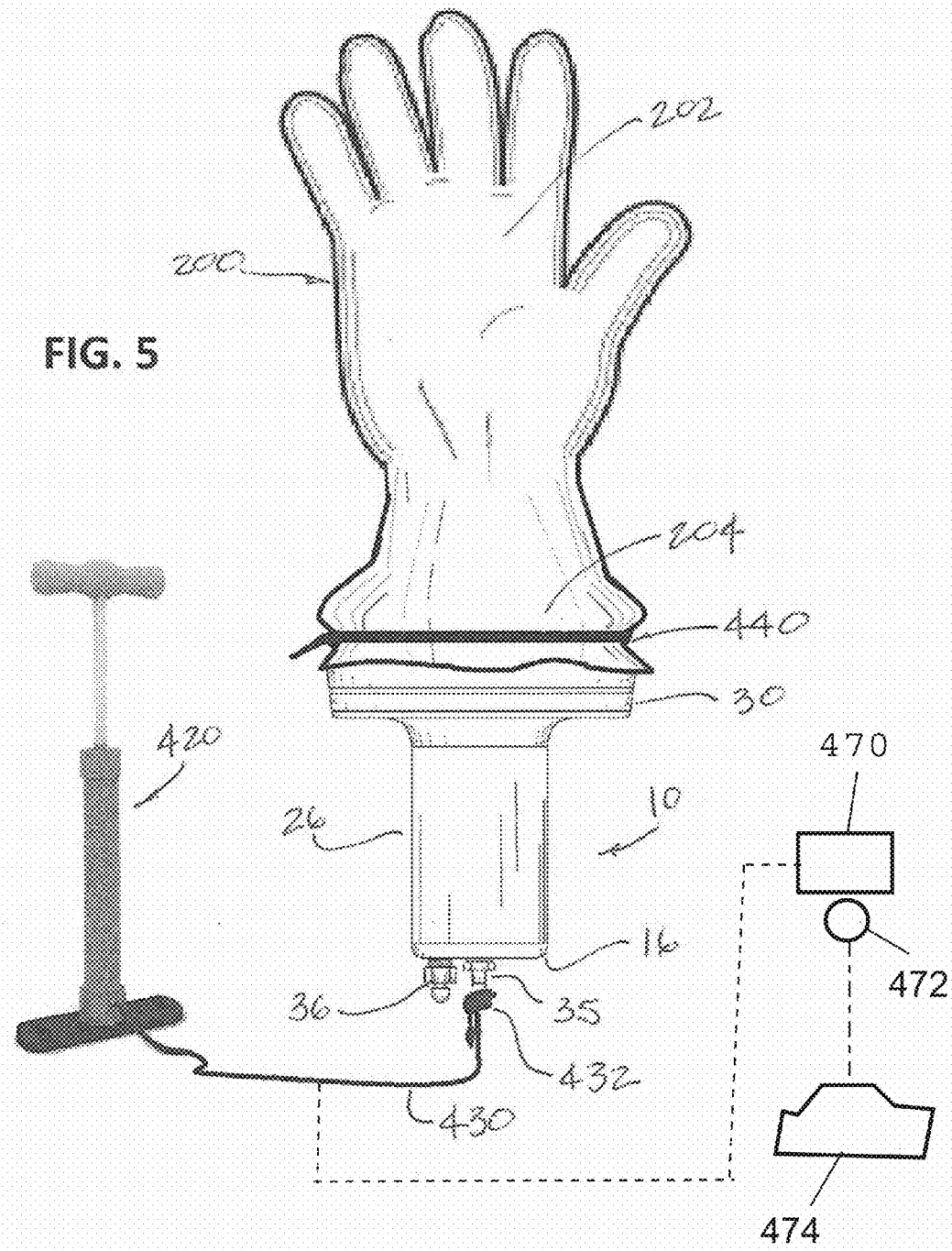
FIG. 5 shows a side view of a glove fitted onto an adaptor and being pressurized for a high pressure source.

With reference now to FIG. 5, a glove 200 is shown comprising a hand portion 202 and a cuff portion 204 is mounted onto an adaptor 10 and secured thereto by a removable strap 440. After the cuff portion 204 of the glove is placed over the first section 30 of the adaptor 10, the strap 440 is tightened around the glove and over the groove 20 of the first section 30. A head valve 432 of an air hose 430 is then connected to inlet valve 35 so that pressurized fluid generated by the inflation device 420 can be directed into the interior of the adaptor 10 to inflate the glove 200. In the embodiment shown, the inflation device 420 is a hand pump. In an alternative embodiment, the inflation device is a portable air compressor 470 with a connection 472 that operates on DC voltage, such as 12-Volt power, supplied from or by a vehicle 474. Prior to adding pressurized fluid into the adaptor or shortly thereafter to an adequate pressure, a leak indicator, such as liquid soap, is generously applied throughout the exterior surface of the glove to use in detecting leaks. If the glove is compromised, such as having one or more pin-holes, the liquid soap will form bubbles to indicate one or more leaks. Liquid soap may also be applied to the adaptor and to any other locations where leaks are suspected, such as near cuff and/or groove to ensure a tight seal.

Figure 6A:
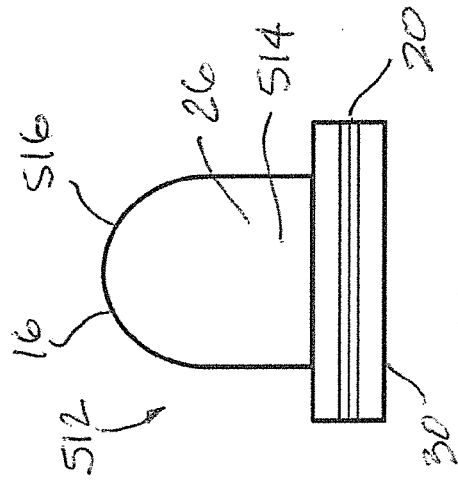
FIGS. 6A-6D show different shaped adaptors in accordance with the present disclosure for use to test electrical insulating gloves.

With reference now to FIGS. 6A-6D, various alternative adaptors provided in accordance with aspects of the present device, system, and method are shown. With reference to FIG. 6A, the adaptor 500 shown has a first adaptor component 502 comprising a first section 30 having a groove 20 for connecting to a glove and a second adaptor component 504 having a second section 26 for connecting to a pressurized fluid source, similar to the adaptor of FIGS. 1-3. As previously alluded to, the first adaptor component 502 may be connected to the second connector component 504 and may be part of an adaptor connecting set, i.e., form fitting adaptor set, having different sized first sections 30 for fitting with different sized gloves. The connection between the two components may embody companion slip-on tapers or may comprise a threaded connection. Furthermore, while the second adaptor component 504 is shown as being generally cylindrical, it can embody other shapes and configurations. Most preferably, both sections 502, 504 are rigid and non-collapsible for reasons discussed above.

Figure 6B:
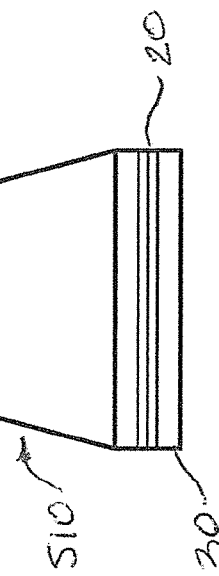

FIG. 6B shows another alternative adaptor 506 provided in accordance with aspects of the present device, system, and method. The adaptor 506 has a first section 30 having a groove 20 for connecting to a glove and a second section 26 for connecting to a pressurized fluid source, similar to the adaptor of FIGS. 1-3. Additionally, a frusto-conical section 508 is provided connecting to both the first and the second sections 30, 26.

Figure 6C:
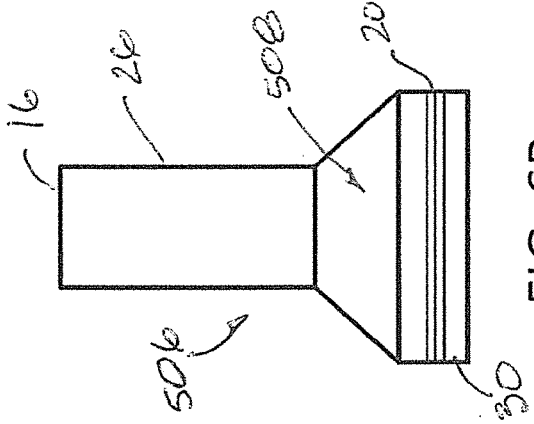

FIG. 6C shows another alternative adaptor 510 provided in accordance with aspects of the present device, system, and method. The adaptor 510 has a first section 30 having a groove 20 for connecting to a glove and a second section 26 for connecting to a pressurized fluid source, similar to the adaptor of FIGS. 1-3. In the present embodiment, the entire second section has a frusto-conical shape configuration.

Figure 6D:
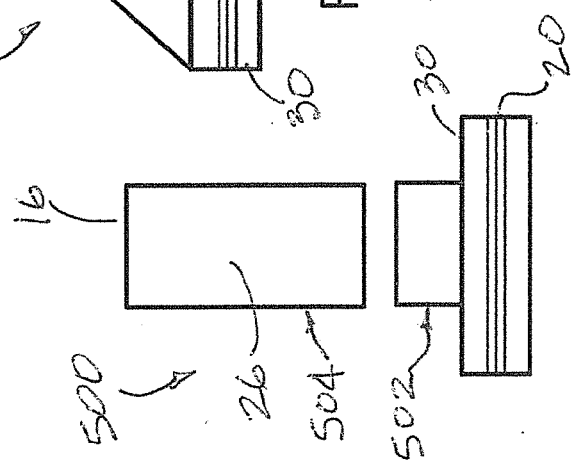

FIG. 6D shows yet another alternative adaptor 512 provided in accordance with aspects of the present device, system, and method. The adaptor 512 has a first section 30 having a groove 20 for connecting to a glove and a second section 26 for connecting to a pressurized fluid source, similar to the adaptor of FIGS. 1-3. In the present embodiment, the second section 26 has an elongated section 514 and a semi-spherical end 516.

An inlet valve, a relief valve, or a combination inlet and relief valve may be mounted or installed in any part or section of any of the adaptors described in FIGS. 6A-6D and not necessarily limited to the second end 16.

Figure 7:
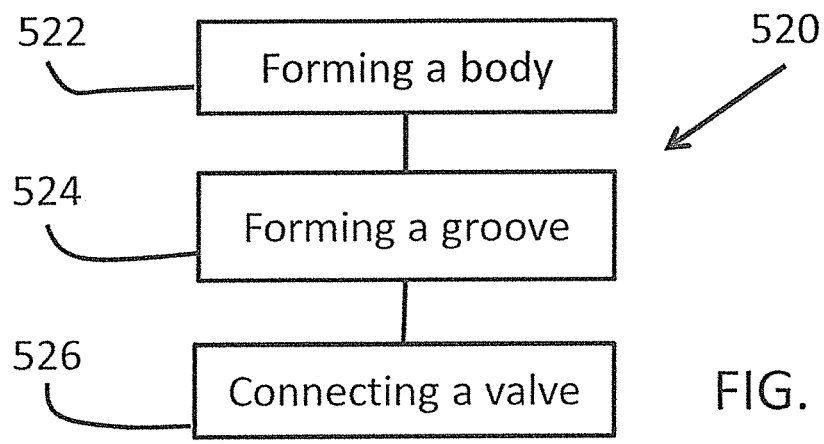
FIG. 7 shows a method of making an adaptor in accordance with the present disclosure.

FIG. 7 depicts a process or method 520 for making an adaptor in accordance with aspects of the present disclosure for use to test an electrical insulating glove. In one example, without limiting the process to the sequence described unless the context indicates otherwise, the method comprises forming an adaptor body comprising a bore defining a cavity at step 522 from a hard plastic or a from a metallic material that is not collapsible during normal use. The body can comprise a shape or configuration described with reference to FIGS. 1-3 and 6A-6D. The adaptor has a first section and a first end and a second section and a second end. The method further comprises the step of forming a groove on an exterior surface of the body at step 524 for receiving a strap or a band. The method further comprises forming a bore for attaching or connecting a valve 526 for use to direct pressurized fluid into the cavity of the body. The valve can be a one-way valve, as previously discussed. Further, the body can be made from a single piece or from multiple pieces that are then assembled to form a rigid adaptor having a glove end and a pressurized fluid source end. The multiple pieces can form part of a set having different sized first end or glove end for receiving different cuff sizes. Optionally, a relief bore is formed on the body for installing a relief valve.

Figure 8:
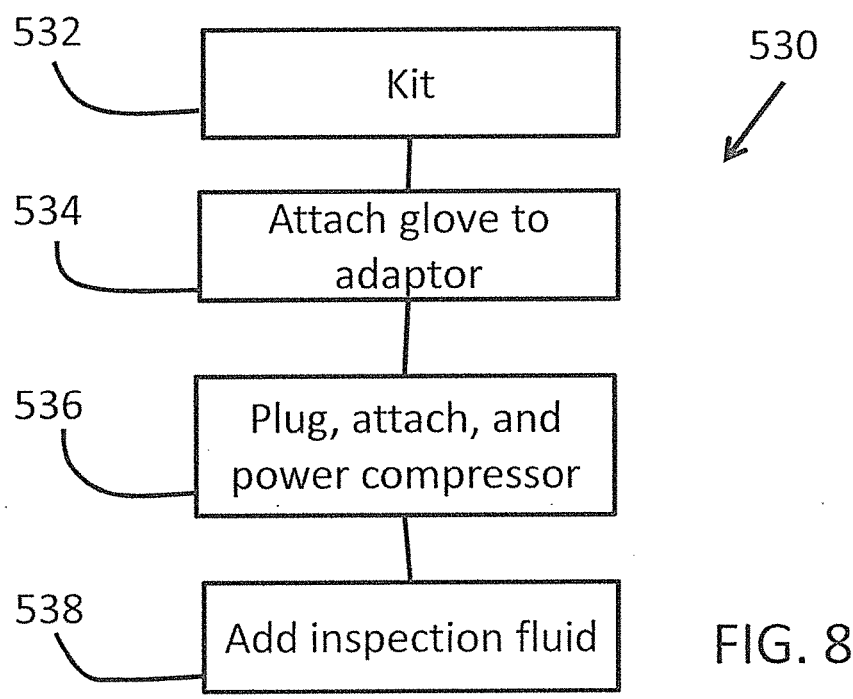
FIG. 8 shows a process for testing an electrical insulating glove in accordance with the present disclosure.

FIG. 8 depicts a process or method 530 for testing an electrical insulating glove in accordance with the present disclosure. Without limiting the process to the sequence described unless the context indicates otherwise, at step 532, the method comprises obtaining a kit, which includes a bucket comprising various components located therein, including an adaptor, such as one of the adaptors disclosed in FIGS. 1-3 and 6A-6D. The bucket further comprises an inflation device, a band, an air hose, and an inspection dispenser, such as liquid soap configured for generating bubbles. At step 534, the process comprises obtaining an insulating glove and attaching the cuff end of the glove to the first open end or glove end of the adaptor. A removable strap or band is used to fasten the glove to the adaptor by tightening the band around the glove and against an external groove formed at the first end of the adaptor. Next, the process comprises hooking a pressurized source to the adaptor. At step 536, the process includes plugging a power cord into a DC power source, attaching a hose between a portable air compressor and a valve located on the adaptor, typically at the second end of the adaptor, and then powering up the air compressor. At step 538, the process includes applying inspection fluid to the glove and/or to the adaptor so that if a leak passes through the glove or the adaptor, the inspection fluid will form bubbles thereby indicating a leak. In an alternative embodiment, the pump is a manual hand pump or air pump.

Although limited embodiments of the glove testing system assemblies and their components have been specifically described and illustrated herein, many modifications and variations will be apparent to those skilled in the art. For example, the various systems may incorporate additional components, such as equipment for drying the gloves after testing, etc. Furthermore, it is understood and contemplated that features specifically discussed for one inspection adaptor system embodiment may be adopted for inclusion with another inspection adaptor system embodiment, provided the functions are compatible. Accordingly, it is to be understood that the inspection adaptor system assemblies and their components constructed according to principles of the disclosed device, system, and method may be embodied other than as specifically described herein. The disclosure is also defined in the following claims.

What is claimed is:

1. A portable system for inflating a glove, including testing the glove for leaks, comprising:
   a carryable container holding a plurality of components needed for testing a glove; said plurality of components comprising:
   an adaptor having a first end and a second end, said first end sized and shaped to create a sealed volume in combination with a glove to be tested;
   an inflation device for generating pressurized fluid for introduction into the sealed volume;
   an air hose for connecting the inflation device to the adaptor;
   a strap configured to be tightened around the first end of the adaptor for securing a glove to the first end of the adaptor;
   a dispenser for dispensing a leak detection substance on an exterior surface of a glove during testing of the glove; and
   wherein the inflation device operates on DC power or is manually operable and the components are sized to fit in the container when the container is closed; and
   wherein the adapter comprises:
   a body comprising a first section having the first end and a second section having the second end formed from a non-compressible material; the first section comprising an interior surface defining a first bore section and an exterior surface comprising an external annular groove; the second section comprising a second bore section, an end surface, and an inlet bore formed through the end surface;
   a one-way valve connected to the inlet bore at the end surface, said valve having a spring;
   a relief bore extending from the end surface; and
   a transition disposed between the first section and the second section and wherein the first section is about 1.4 to about 2.5 times larger in cross-sectional dimension than the second section.

2. A method for inflating a glove using the portable system of claim 1, the method comprising:
   placing a cuff of a glove around the first end of the adaptor;
   tightening the strap around the cuff and against the groove on the exterior surface of the adaptor;
   connecting the hose to the valve and to the inflation device;
   applying the leak detection substance from the dispenser to the glove; and
   operating the inflation device to direct pressurized air in through the valve and into the glove.

3. The method of claim 2, further comprising a transition between the first end and the second end.

4. The method of claim 2, further comprising a second valve for depressurizing the adapter, the second valve connected to the relief bore.

5. The method of claim 4, wherein the second valve is configured to open automatically once the internal pressure reaches a certain pressure.

6. The method of claim 2, wherein the inflation device is powered by DC power.

7. The method of claim 6, wherein the DC power is supplied from or by a vehicle.

8. The method of claim 2, wherein the inflation device is a manually operated hand pump or foot pump.

9. The method of claim 2, wherein the carryable container has a removable and resuable lid.

10. The method of claim 2, wherein the first end and the second end of the adaptor extend along a common longitudinal axis.

11. The portable system of claim 1, wherein the first section and second section of the adapter extend along a common longitudinal axis.

12. The portable system of claim 1, further comprising a second valve for depressurizing the adapter, the second valve connected to the relief bore.

13. The portable system of claim 12, wherein the second valve is configured to open automatically once the internal pressure reaches a certain pressure.

* * * * *

UNITED STATES PATENT AND TRADEMARK OFFICE
CERTIFICATE OF CORRECTION

PATENT NO. : 9,625,347 B2
APPLICATION NO. : 14/314884
DATED : April 18, 2017
INVENTOR(S) : Rogelio Marquez, Jr. et al.

It is certified that error appears in the above-identified patent and that said Letters Patent is hereby corrected as shown below:

In the Claims

In Column 10, Line 29, in Claim 9, delete "resuable" and insert -- reusable --, therefor.

Signed and Sealed this
Fourth Day of December, 2018

Andrei Iancu
*Director of the United States Patent and Trademark Office*